March 11, 1952 A. J. MOLDENHAUER 2,588,865
ART OF TREATING LEGUMES

Filed July 29, 1948 8 Sheets-Sheet 1

FIG. 1.

INVENTOR:
AUGUST J. MOLDENHAUER
BY
ATTORNEYS.

March 11, 1952  A. J. MOLDENHAUER  2,588,865
ART OF TREATING LEGUMES

Filed July 29, 1948  8 Sheets-Sheet 4

INVENTOR:
AUGUST J. MOLDENHAUER
BY Bruniga & Sutherland
ATTORNEYS.

INVENTOR:
AUGUST J. MOLDENHAUER
BY Brunnig & Sutherland
ATTORNEYS.

Patented Mar. 11, 1952

2,588,865

UNITED STATES PATENT OFFICE 2,588,865

ART OF TREATING LEGUMES

August J. Moldenhauer, Menfro, Mo., assignor of one-third to John H. Bruninga, St. Louis County, Mo.

Application July 29, 1948, Serial No. 41,309

16 Claims. (Cl. 99—2)

This invention relates to the art of treating legumes, such as alfalfa, the various clovers, and the various lespedesas, more particularly to reduce the legume to a meal. This application embodies subject-matter common to application S. N. 442,732, filed May 31, 1943.

Various processes and apparatus have been employed and suggested for the treatment of legumes in order to reduce the same to a meal. Probably the first method employed was to take the sun-cured or dehydrated legume and to subject the same to the action of said centrifugal-impacting-comminution by passing the same through an ordinary hammer mill. However, by this method the organic constituents of the legume are converted, thereby reducing the feeding value of the resultant legume meal. Thus where the green legume contains, in its green state, carotene units on the order per pound of over 100,000 such units and equivalents to vitamin A units per pound of over 200,000, upon sun-drying these are reduced to approximately $\frac{1}{100}$ of their value in the green legume; that is, on the order of 1,000 and 2,000 respectively. Furthermore, where in the green legume the protein is on the order of 22% and the crude fiber on the order of 19%, by sun-curing the protein is reduced to the order of 12% while the crude fiber is increased to the order of 34%. These values are actually found for alfalfa meal in which the moisture has been reduced by sun-curing to the order of about 8%. Moreover, the other organic components are likewise disadvantageously affected by sun-drying.

Where sun-drying is replaced by artificial drying, as by passing the green legume through a drier maintained at a dehydrating temperature followed by comminution, even by centrifugal-impacting-comminution, the results obtained by preliminary sun-drying are really not improved; in fact the results attained are if anything worse, because of the more rapid breaking down or conversion of the organic components of the green legume.

While dehydration is facilitated by the chopping up of the green legume or even pre-shredding of the same followed by subjecting the legume to dehydrating temperatures, the results are still not materially improved over the sun-drying process.

One of the objects of this invention, therefore, is to provide a novel means of treating legumes whereby a green legume can be rapidly and economically reduced to a meal while maintaining unimpaired the organic constituents of the legume and particularly the carotene and vitamin constituents, and while maintaining a more favorable relation of protein to crude fiber.

Another object is to provide an improved legume meal containing substantially the desired organic constituents of the original green legume, and more particularly the carotene and vitamin A constituents, and the high percentage of protein and correspondingly low percentage of crude fiber.

Further objects will appear from the detail description, in which will be set forth a number of embodiments of this invention. It will be understood, however, that this invention is susceptible of various embodiments, within the scope of the appended claims, without departing from the spirit of this invention.

Generally stated, and in accordance with an illustrative embodiment of this invention, the green legume is preliminarily chopped to short lengths in order to more readily permit its introduction into the process. The green legume is heated while subjected to comminution, at a temperature and for a period, both sufficient to reduce the legume to a meal. This can be conveniently accomplished by subjecting the green legume to a heating zone, and subjecting the legume to comminution in that zone. In order to secure the most favorable results economically, the comminution is at a rapid rate, at a high temperature, and for a short period. The legume is moved out of the zone of heating and comminution as soon as it becomes comminuted and before any material conversion of the organic constituents of the legume, although the heating in the heating zone is at a temperature above 500°, and may be as high as 1500°. In practice, the exposure of the green legume to the heating zone is for a period on the order of a minute, the comminution being sufficiently rapid to move the legume out of the heating zone in a period of that order.

In accordance with an illustrative embodiment of this invention, the legume is subjected to comminution in the heating zone in a condition where it is free in space in that zone. This can be accomplished by subjecting the green legume to a heating zone while subjected to centrifugal-impacting-comminution and moving the legume centrifugally out of that zone as it becomes comminuted. The centrifugal impacting and the temperature in that zone are, however, so coordinated as to cause the legume to move out of the heating zone after substantial dehydration of the legume, but before material conversion of the organic constituents of the legume.

While the process is so carried out that there is no material conversion of the organic constituents of the legume, the legume as finally reduced to a meal is still at a temperature where deterioration may take place if the meal is immediately packaged or stored. In accordance with an illustrative embodiment of this invention therefore, and after the reduction of the legume to a meal, the temperature of that meal is reduced to normal by subjecting the legume to a cooler zone than during dehydration; this may be accomplished while further comminution takes place. The legume may therefore be packaged or stored at practically normal outside or room temperature.

In the accompanying drawings, illustrating various embodiments of this invention.

Figure 1:
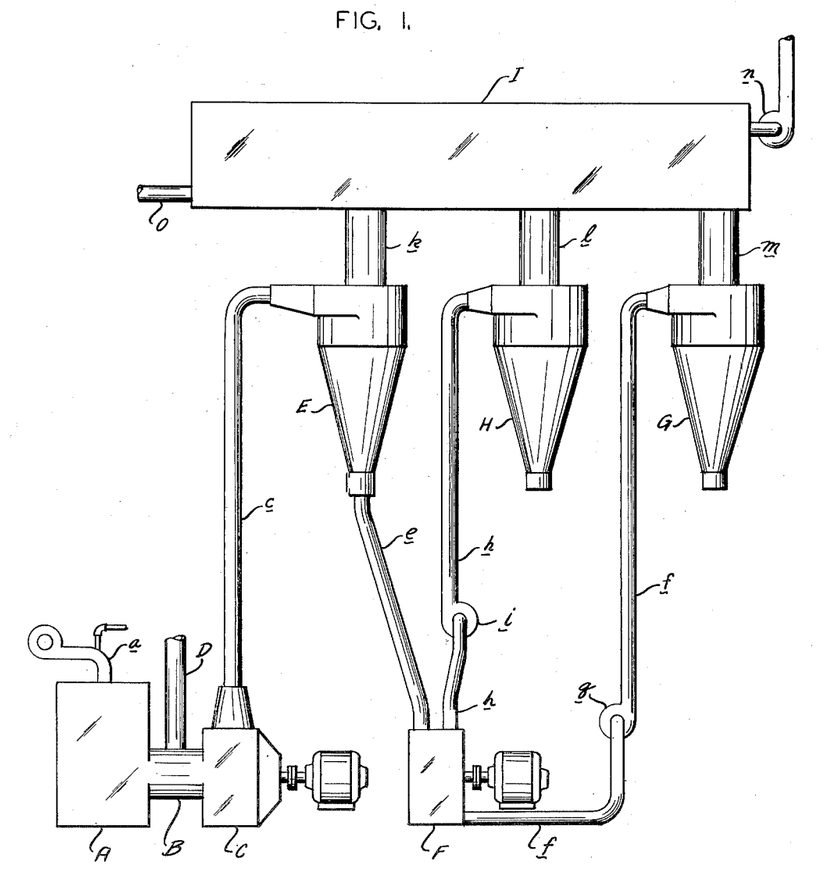
Figure 1 is a flow sheet, illustrating one embodiment of this invention.

Referring first to Figure 1, which is a flow sheet illustrating one embodiment of this invention, the parts have been more or less conventionally illustrated, and designations are applied, although the parts will be more fully described in Figures 3 to 8 inclusive. In Figure 1, A designates a furnace of a suitable construction, receiving fuel as shown at $a$. This furnace communicates with a casing B forming a chamber, and connected centrally with a centrifugal-impacting-comminuting mechanism C, which may be in the form of a hammer mill provided with a suitable rotor revolving inside of a perforated metal screen encompassing the rotor generally as usual in hammer mill structures. Chopped legume is fed into the chamber as generally shown at D onto the hot gases from the furnace to the hammer mill, where the legume is subjected to simultaneous comminution and heat. The comminuted legume and the gasses passing through the screen are led by a suitable pipe $c$ to the top of a separator E, which may be of the cyclone type. From the separator E a pipe $e$ connects to one side of a second hammer mill F and to the interior thereof, this hammer mill being likewise provided with a suitable rotor and a suitable screen. The comminuted material and the gases issuing through the screen are led by a pipe $f$ through a blower $g$ to the top of another cyclone type separator G from which the meal issues at the bottom; this is the leaf meal. The other side of the hammer mill is provided with an opening controlled by a valve, as hereinafter explained, from which the comminuted stem meal is led by a pipe $h$ through a blower $i$ to another cyclone-type separator H for the stem meal.

The separators E, H, and G may be connected by pipes $k$, $l$, and $m$ respectively to a bag house I of suitable and usual construction, so as to cause any meal tending to escape in the air to enter the bags within the bag house casing. The outside of the bag house is connected to a blower $n$ to draw the gases through the bags, while the very fine legume meal is deposited on the inside of the bags. The bag house is provided with the usual bag shaking mechanism (not shown), which periodically shakes the bags in order to cause the legume meal deposited therein to drop to the bottom of the bag house, from which it is withdrawn at $o$.

I will now proceed to describe the construction of the various units shown in the flow sheet Figure 1, the reference letters being generally applied, supplemented by reference numerals to show details of construction. This is of course one embodiment of this invention.

Figure 2:
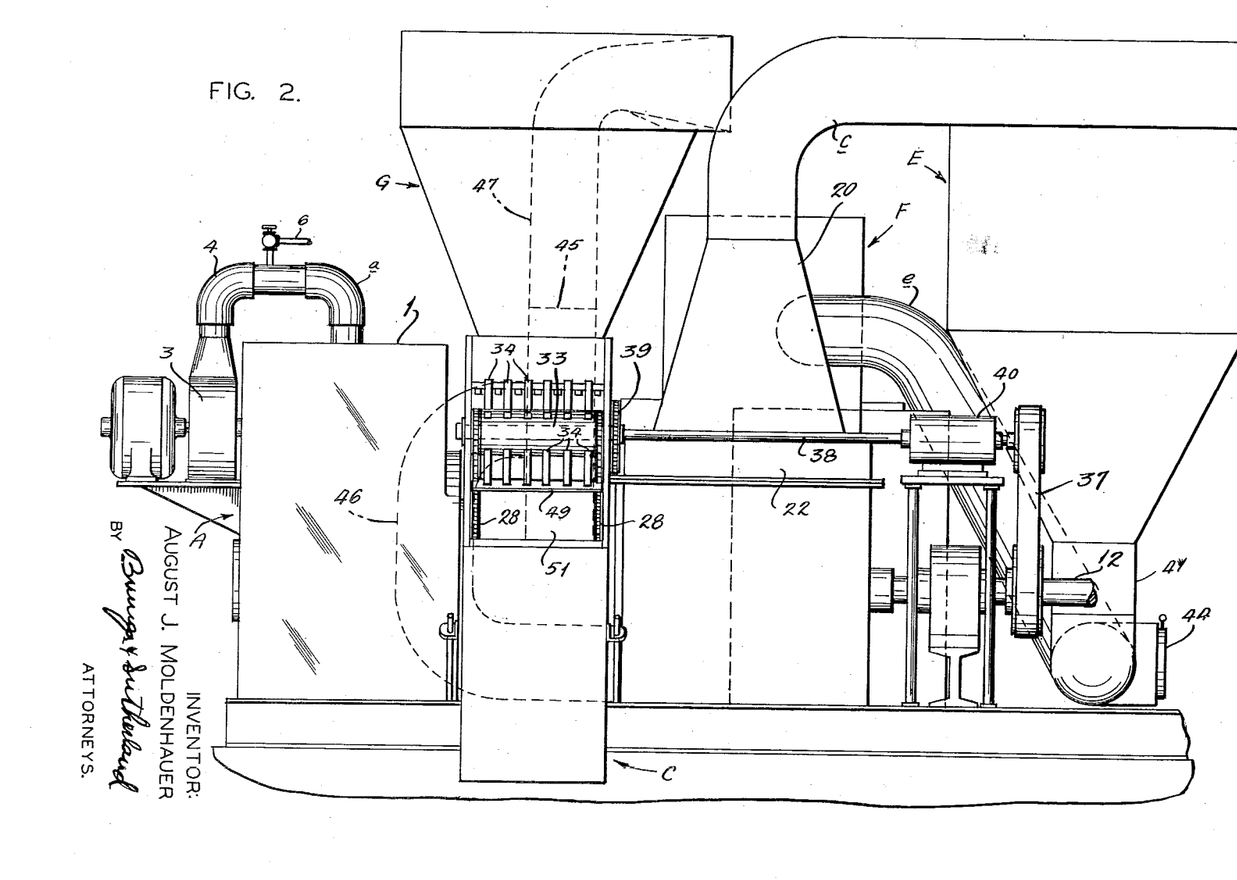
Figure 2 is a side elevation of an apparatus adapted for carrying out this invention.
Figure 3:
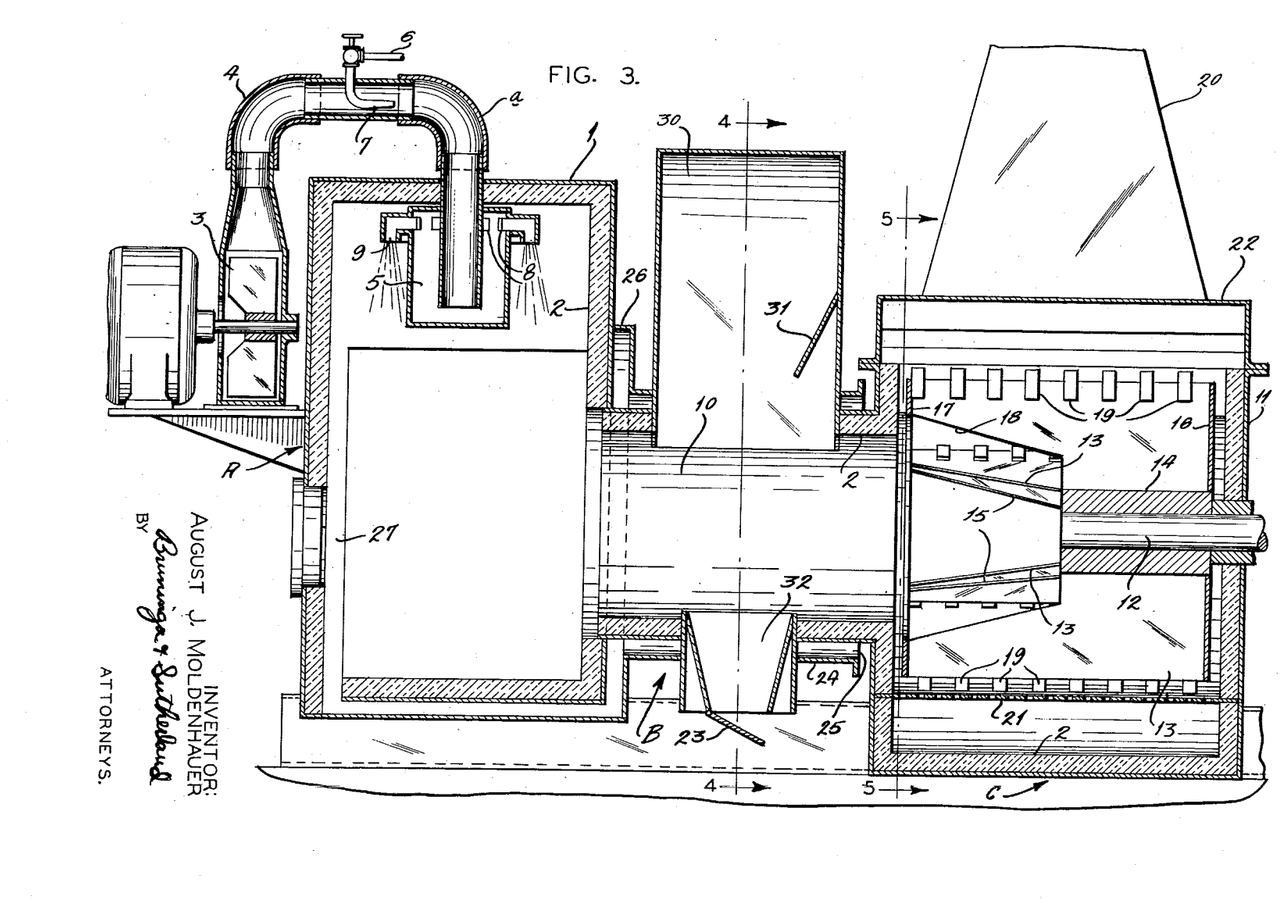
Figure 3 is a longitudinal section on the line 3—3 of Figure 4.

Referring now first to Figures 2 and 3: 1 designates the housing of the furnace A having a lining 2 of ceramic or other heat-resisting material. A blower 3 suitably mounted on the housing 1 delivers a blast of air via a pipe 4 to a vaporizing chamber 5. Fuel, such as oil, is delivered by a supply pipe 6 to a jet or nozzle 7 within the pipe 8. The fuel and air thus conveyed by the pipe 4 are mixed and the fuel vaporized in the chamber 5. The latter chamber may be in the form of an iron pot suspended in the upper part of the housing 1. In the arrangement illustrated this pot has a plurality of peripheral openings 8 in the upper part thereof, which openings communicate with a downward-directed annular flame nozzle 9. By this arrangement the annular flame surrounds and impinges upon the pot forming the chamber 5, so as to heat the same in order to vaporize the fuel as it passes through that chamber.

The furnace housing 1 is connected by the tubular duct 10 of the casing B, also lined with refractory material 2, with the housing 11 of the hammer mill C, similarly lined. Within the housing 11 there is rotatably mounted on a shaft 12 a rotor comprising a series of plates 13 (Figures 3 and 5) mounted on a hub 14 to extend radially therefrom. Each plate 13 is braced by a similar plate 15 welded or otherwise secured to the plate 13 at its outer edge and to the hub 14. The plates 13 and 15 are supported additionally by being welded or otherwise secured to a plate 16 at one end and to a ring 17 at the other end. At the end facing the duct 10 the plates 13 and 15 are cut away as indicated at 18, to provide for entrance of the hot blast to the hammer mill. Each of the plates 13 is provided at its outer edge with a series of hammers 19, as usual in hammer mill rotors.

Figures 5, 7:
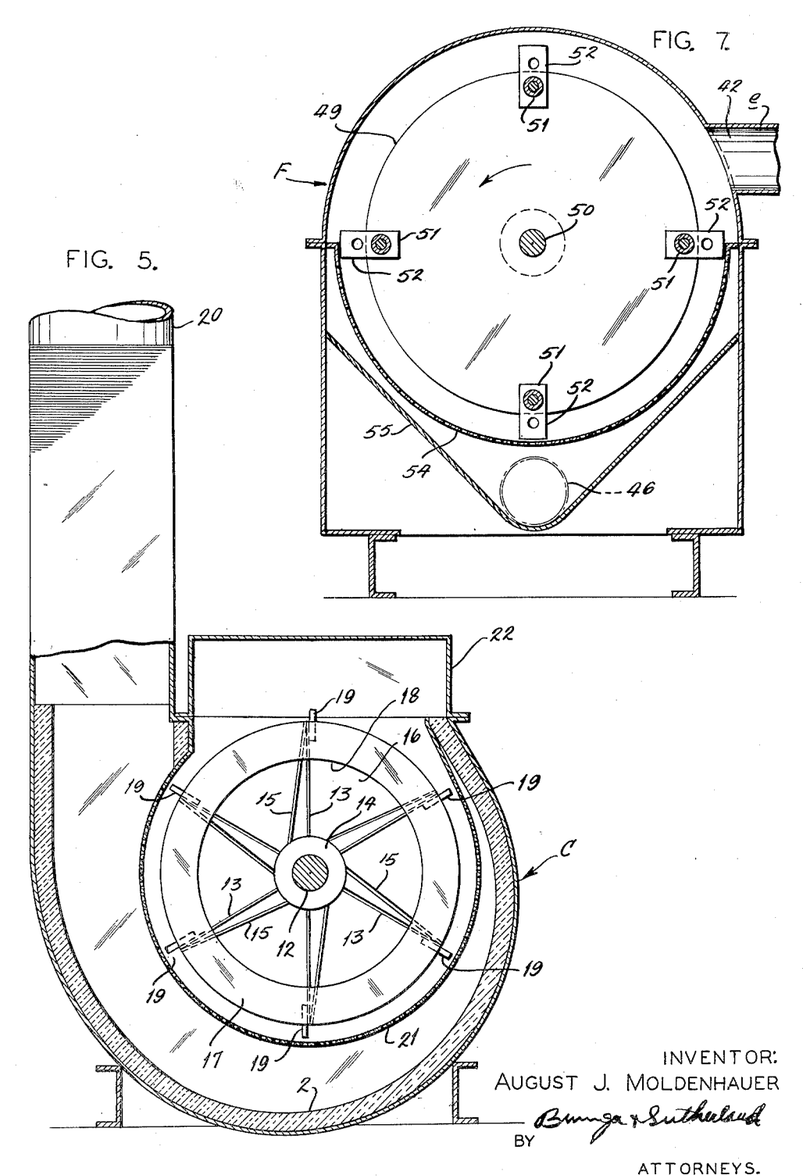
Figure 5 is a section on the line 5—5 of Figure 3.
Figure 7 is a section on the line 7—7 of Figure 6.

The plates 13 are arranged to provide blower blades and the housing 11 may be of involute form, as seen in Figure 5, so that a combined hammer mill and blower is formed. The hot gases enter the hammer mill through the ring 17 and are blown out to the entrance of the pipe $c$ which leads to the top of the separator E. A perforated plate 21 of heavy sheet metal is mounted in the housing 11, encircling but radially separated from the rotating hammer element except at the top, leaving a top space which is closed by a removable cover 22. The perforated plate 21 forms the screen of the hammer mill, and the perforations are made of a size adjusted to the material to be comminuted.

The suction set up by the hammer mill blower draws the hot gases through the duct 10 from the furnace 1. The duct 10 may be enclosed by an outer shell or jacket 24 having an air-entrance opening at 25, and communicating with a similar jacket 26 partly enclosing the furnace housing 1 and communicating with the interior thereof through a passage 27. Thus the incoming air is preheated during its travel through the jackets 24 and 26, taking up heat that would otherwise be wasted by radiation. Entering the furnace by the passage 27, the air then helps to complete the combustion of the fuel, takes up excess heat of the flame and thus reduces the temperature of the combustion gases to the desired value. The gases, so tempered, are then delivered to the duct 10 and from there to the interior of the hammer mill.

Figures 4, 8:
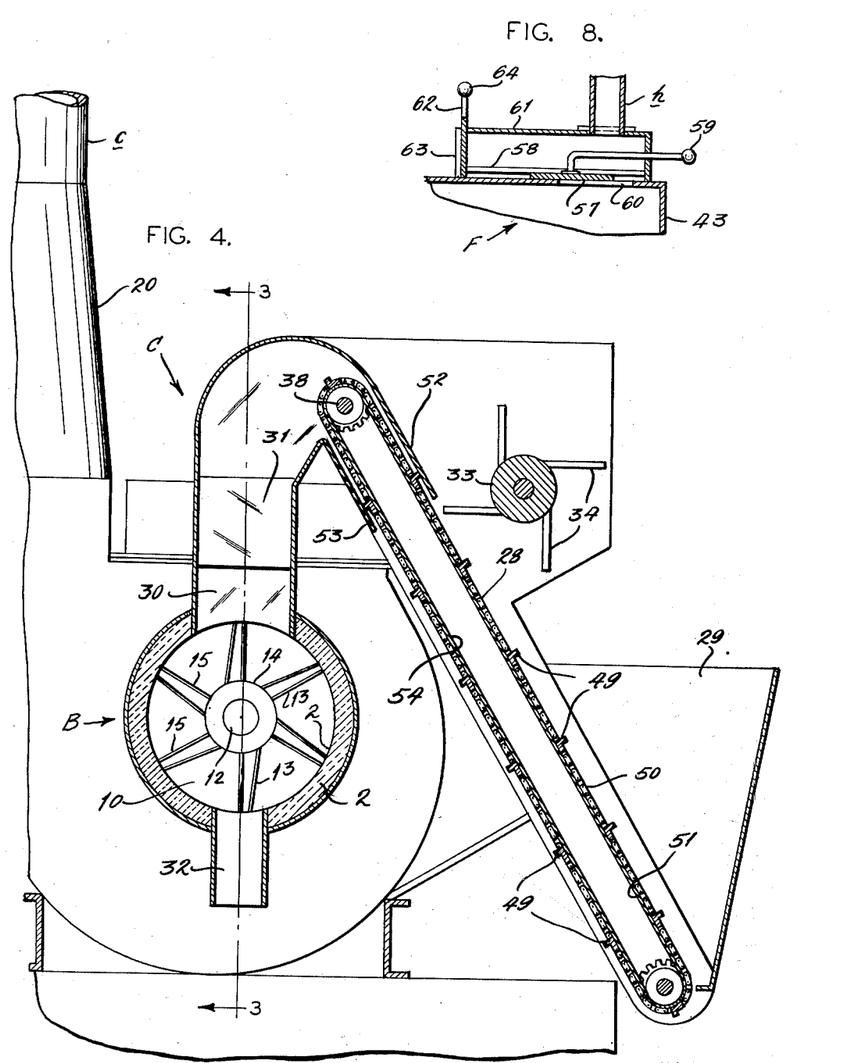
Figure 4 is a transverse section on the line 4—4 of Figure 3.
Figure 8 is a detail section on the line 8—8 of Figure 6.

Legume feeding mechanism is shown in Figures 2 and 4. A conveyor 28, which may be provided with a receiving hopper 29, is arranged to receive the material (usually chopped) to be processed, from trucks or other source, and deliver it to a feed chute 30 opening into the duct 10. As the material drops from the chute 30 it is caught up by the hot gases through the duct 10 and carried into the hammer mill. The chute 30 may be provided with a deflector plate 31 arranged so that foreign matter, such as rocks and pieces of metal, entering too near the hammer mill opening will be deflected so as to drop through a tapering outlet 32 in the bottom of the duct 10. While the outlet 32 provides an air inlet to the duct, it is usually throttled by the green legume falling therein. Moreover the outlet 32 may be designed to admit only such amount of air as will not interfere with the operation and may be controlled by a settable damper 23, which while adjustable will still permit pieces of stone and metal to pass out.

In the particular arrangement shown, the conveyor 28 comprises a series of cross flights 49 carried by side chains 50 and moving along a plate 51 along which the material is carried. The upper part of the chute 30 is housed over as shown in Figure 4, and the housing is extended down above and below the conveyor as indicated at 52 and 53 respectively. These extensions are spaced from the plate 51 and a corresponding lower plate 54 just enough to provide clearance for the flights 49, and are extended down far enough so that there is always at least one flight in each of these clearance spaces to close said spaces against the entrance of an excess draft of air, as the chute 30 is subject to the suction active in the duct 10. Mounted on the upper part of the conveyor 28 is a regulator comprising a rotor 33, provided with a series of combs 34 arranged to sweep excess material off of the conveyor 28 before it delivers it to the chute 30; the excess falls back into the hopper.

The hammer mill and the conveyor 28 may be provided with independently adjustable variable-speed drives so that these speeds may be adjusted relatively and to the legume and the temperature of the hot gases. Thus, by controlling the rate at which the material passes through the apparatus and the temperature of the gases, the simultaneous drying and comminuting can be carried out in such a way that the comminuted material passes through the screen 21 at a rate to keep pace with the feed, and at the same time the proper state of dehydration is achieved.

The shaft 12 may be driven by suitable means such as an engine or motor (not shown) which is adjustable as to speed so that the speed of the hammer mill may be set as desired. The conveyor 28 may be driven by an independent source of power, or it may be driven from the same source as the shaft 12. The latter arrangement is indicated in the drawing by a belt drive 37 from the shaft 12 to the conveyor-drive shaft 38, from which the regulator 33 may also be driven by a chain 39. Interposed in the shaft 38 is a speed-changing device of any suitable type, indicated conventionally at 40. This provides means whereby the speed of the conveyor 28 may be adjusted to conform to the processing carried out in the hammer mill. This adjustment may be automatic by employing a well-known speed adjusting mechanism 40 provided with a governor, so that the legume will be fed at a set rate into the duct 10 and from there to the hammer mill. Such mechanism may also be provided with a cut-out when the speed drops materially below the set rate, the feed of the legume will be interrupted. Thus if the system should become clogged the feed will be stopped until the system clears. The mechanism may be of the well-known thermally controlled type in which the pyrometer may be located in the outlet of the hammer mill and in the path of the meal, so that the rate of feed will be such as to maintain a given temperature in the hammer mill outlet.

Figure 6:
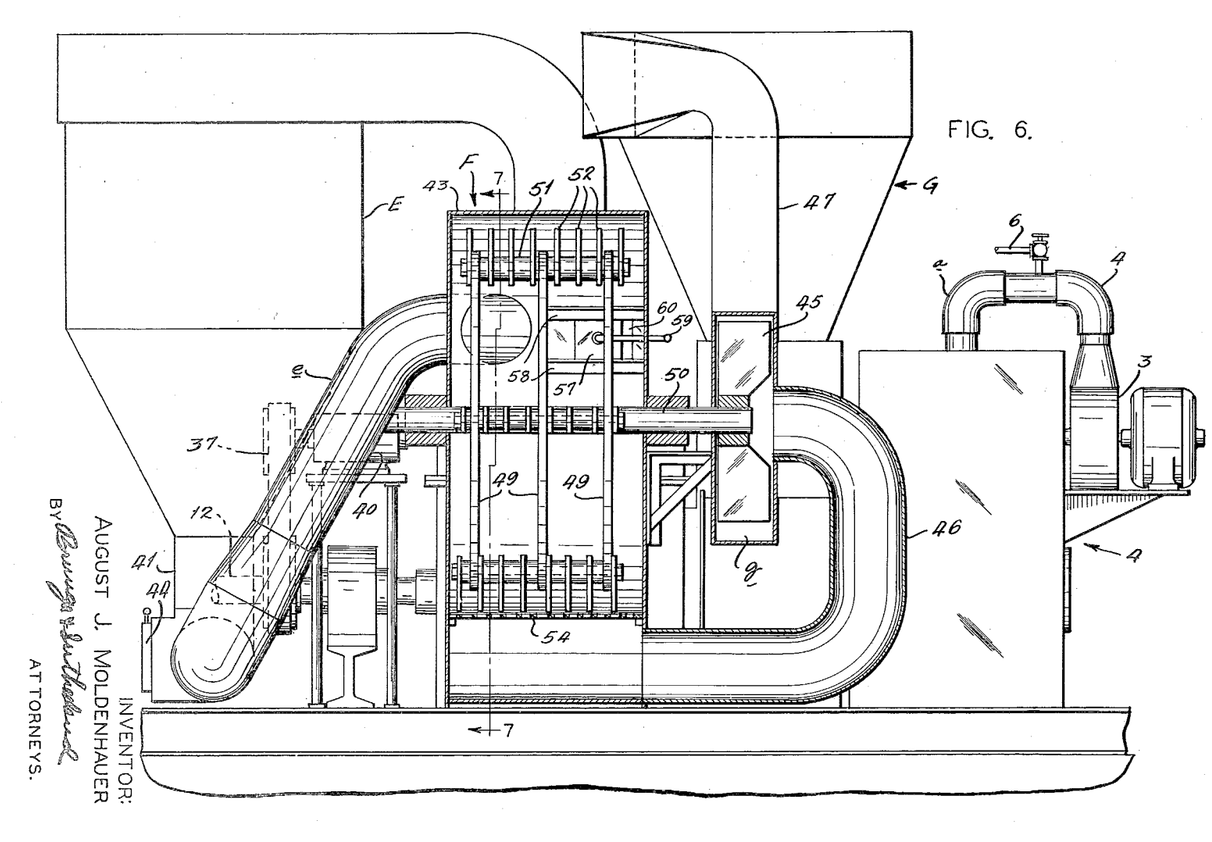
Figure 6 is a rear view of Figure 2, with parts in section along the line 6—6 of Figure 7.

Referring to Figures 2 and 6, the discharge neck 41 of the separator E may be connected by the pipe e to convey the collected material to the casing 43 of a second hammer mill F or other processing apparatus. At a suitable point along the pipe e an air inlet gate 44 may be provided. The blower g provided with a rotor 45 draws the processed product from the hammer mill F by a duct 46 (f in Figure 1) and delivers it, via a duct 47, to the second separator G. The suction created by the blower 45 draws cool air in at the gate 44 and also draws the collected material from the neck 41.

As shown in Figure 6, the hammer mill has a rotor consisting of a series of circular plates 49 mounted in spaced relation on a shaft 50 which may be driven from the primary source of power by any suitable connections, not shown. The blower 45 may also be driven by the shaft 50 as shown. Passing through the plates 49 at uniformly-spaced points of the peripheries are rods 51 on each of which is mounted a series of hammers 52. These hammers may be separated by spacing rings 53 on the rods 51. Each hammer is usually provided with two holes, as shown in Figure 6, so that it may be turned end-for-end on the rod 51 when one end becomes worn.

Surrounding the lower half of rotor is a screen 54 of perforated sheet metal. This screen is located sufficiently close to the tips of the hammers 52 to operate on the material, permitting passage through its perforations when small enough. The lower part of the housing is formed trough-shaped, as indicated at 55 in Figures 6 and 7. The duct 46 connects with the housing at the bottom of this trough so as to draw out the material that passes through the screen 54.

As shown in Figure 6, the duct e connects with the upper part of the housing of the hammer mill F near one side, i. e. the left side thereof. This serves, therefore, to deliver the material at the left, while the duct 46 connects to the right side e of the housing. As shown in Figures 6 and 8, the housing 43 of the mill F is provided with a gate 57 slidable in guides 58 and having an operating handle 59. This gate is adjustable to provide an exit opening 60 to a casing 61. The suction duct h is connected to the casing 61 opposite the opening 60. The right end of the casing 61 is closed but the left end is provided with a gate 62, settable in guides 63 and provided with a handle 64. The guides 58 and 63 are sufficiently tight to hold the gates 57 and 62 in set positions.

The operation in the production of legume meal, such as alfalfa meal, will be as follows, having particular reference to the flow sheet Figure 1 in connection with the structural details shown in Figures 2 thru 7:

The burner will establish a zone of hot gases within the furnace A, which hot gases pass through the chamber B to the interior of the hammer mill C, and these hot gases passing through the screen of the hammer mill are conducted to the cyclone separator E. This flow of gases is established, in the particular embodiment shown in Figure 4 and indicated in Figure 1, by the blower 3 plus the blower action within the hammer mill; although in some cases the blower action of the hammer mill may be sufficient to establish such flow of gases through the system so far described. If desired, a blower may, however, be placed in the pipe c from the hammer mill to the cyclone E.

A green legume such as alfalfa as cut in the field and chopped to short lengths, is fed into the zone of hot gases within the chamber B, and is carried into the hammer mill. Here a combined action of dehydration and comminution takes place, and at a very rapid rate. The result will therefore be that the legume will be dehydrated as it is being comminuted, and comminuted as it is being dehydrated, with the result that the dehydrated and comminuted legume passes through the screen of the hammer mill and is carried to the cyclone separator E along with the hot gases. In this separator the resulting comminuted legume settles and can be drawn off at the bottom, while the gases mainly pass out at the top of the separator.

A green legume contains of course a large percentage of moisture in the leaf portion as well as in the stem portion, and this moisture must be evaporated in order to effect dehydration. This evaporation of course requires the application of heat to the legume in order to convert the liquid moisture into gaseous moisture, and involves not simply the raising of the temperature of the liquid, but also to overcome the latent heat of vaporization of the liquid. Due to this condition therefore the temperature of the hot gases passing through the chamber can be high, and can even be partially maintained within the hammer mill. There will however be a rapid drop in the temperature gradient from the chamber B to the outlet of the hammer mill. As soon as the green legume strikes the hot gases, evaporation will proceed, and this evaporation will continue within the hammer mill and to some extent even beyond its outlet.

Simultaneously with the application of heat to the legume, the action within the hammer mill is to begin to comminute the legume as soon as it comes under the influence of the centrifugal-impacting-comminuting action, so that comminution proceeds very rapidly. As any particular part of the legume is comminuted, the volume of each particle will decrease, while the surface area of the aggregate of the particles will increase at a more rapid rate by virtue of the fact that combined surfaces of the aggregate of the particles into which a given legume part is divided will be much greater than the surface of the original particle before comminution. However, the volume of any particle will be smaller than the volume of the original part. The result is therefore progressively increasing penetration of heat into the particles, and progressively increasing evaporation at the surfaces of the particles. The result is therefore that in accordance with this process, where a green legume is heated while subject to comminution the period of comminution is extremely small, particularly where the centrifugal impacting at the temperature in the zone of heat, where comminution takes place, are co-ordinated.

In accordance with this process, operation upon the principle just described, overheating of the green legume is positively avoided, even though the legume be subjected to temperatures which during the usual mill-drying process would result in overheating. That is due to the fact that the conversion of the latent heat of the liquid and the rapid increase in surface areas of the aggregate particles preserves the actual particle against overheating, even though the temperatures be high. The result is therefore that the carotene, vitamin, and protein contents of the original legume are preserved, while the crude fiber content is not increased at the expense of the protein content.

The comminuted legume as delivered to the separator E can be drawn therefrom for use. It is however desirable to secure more perfect operation of the process and a further improved product, to deliver the product from separator E to a second hammer mill F. Eliminating first the separation of the leaf and stem portions by closing the port 60, Figure 8, the operation will then be as follows:

The product is subjected to a second operation in the hammer mill F, which may have fine screens. Here, however, no heat is necessary, particularly since in continued operation the product entering the hammer mill may be at an elevated temperature. In this hammer mill, however, the product is further comminuted, and by the admission of air by the valve control opening 44 of Figure 2, the product is cooled. As finally issuing from the hammer mill F therefore, and into the separator G, the product, a legume meal, may be delivered at the bottom thereof into suitable bags or into storage. In the hammer mill F the cooling of the product proceeds rapidly because again comminution takes place, with the exposure of the increased surfaces of the aggregate particles and the decrease of the size of any given particle, both subject to the lower temperatures of the air entering the hammer mill. Indeed, this may be even facilitated by passing the air entering the second hammer mill through a refrigerating apparatus.

Returning now to the separation of the stems from the leaves, and referring to Figure 1 in connection with Figures 6, 7, and 8: it will be seen that the product enters the leaf end of the hammer mill F near the top, while the product issuing through the screen is delivered at the bottom and right end. This causes an axial shifting of the stem particles to the right because of the fact that these stem particles tend to remain coarser and are more dense than are the leaf particles. By now opening the port 60 at the right by manipulation of the valve 57, the suction blower i will draw these stem particles out of the hammer mill and conduct them to the separator H, Figure 1. The valve 62 is provided so that a proper draft will be secured to the pipe h so as to inductively as well as positively cause the stem particles to pass into the pipe h and into the separator H. By manipulation of the valves any desired grade of stem portion can be collected in the separator H as related to the leaf portions collected in the separator G. In fact by this adjustment the portion of stem particles and the leaf meal can be reduced by any desired extent. This is of course a great advantage, because the leaf meal is much more valuable than is the stem meal, although the latter can be used as a filler in various feeds.

Perhaps the most valuable product is the very finely comminuted meal, which ordinarily would be carried out of the top of the separators as a dust or as a fog. In accordance with this invention as shown in Figure 1, this dust is collected in the bag house I from which it may be drawn. Such a bag house is of course a well-known piece of apparatus, so that detailed description thereof is not necessary.

In order to further facilitate the disclosure, an actual commercial example will be given. The hammer mill C may have an outside rotor diameter of 36 inches, with the inside diameter of the ring 17 Figure 3 of 18 inches, with the length of the rotor 24 inches, and with the speed in revolutions per minute of 1400. The hammer mill F may have an outside rotor diameter of 56 inches, with a diameter inside of the hammers of 48 inches, with the length of the rotor 24 inches, and rotating at 1400 revolutions per minute; and with the diameter of the pipe e as it enters the hammer mill F of 10 inches. The diameters of the openings of the screen in the hammer mill C are from ¼ to 1/16 of an inch, and in the second hammer mill 1/16 of an inch.

Green alfalfa is cut up into lengths of ¼ of an inch to 1 inch. The temperature in the chamber B in the zone where the alfalfa enters can be from 1,000 to 1,500° F., and the temperature outside of the screen of the hammer mill C will drop to 250° F. The reduction in temperature of the product in the second hammer mill F is very rapid, so that by the time the product reaches the separators H and G it is practically down to room temperature, and dry.

With the above measurements, the approximate length of time from the entrance into the hammer mill C of the chopped green alfalfa to where it reaches the dust collector E is about 10 seconds for the leaves, and about 30 seconds for the stems. In the second hammer mill F the passage therethrough of the leaves takes about 5 seconds, and for the stems about 15 seconds. The above figures are for fifth-cutting alfalfa, made in October of 1947.

The above explains why there will be no overheating of the legume. In the first hammer mill C there will be a very rapid decrease of temperature gradient from a high temperature of 1,000 to 1,500° down to 250° F., with the temperature decreasing very rapidly in the very beginning. Likewise in the second hammer mill F there will be a very rapid reduction of the temperature of the meal, again due to the fact that further comminution takes place during cooling, although on account of the fineness of the product as it enters the second hammer mill the effect of low particle volume and high aggregate surfaces will come into play.

Because of the fact that comminution takes place in the heating zone, the application of the heat to the legume as it is being processed is very efficient. The temperature in the heating zone of the casing B need not therefore be as high as 1,000° F., but may be 500° F. or even lower. In fact the conditions may be so adjusted that alfalfa meal of the desired fineness may leave the first hammer mill C at a sufficiently low temperature where it need not be further cooled.

In such a case the product may be drawn from the first separator E.

To further show the utility of the process em-product obtained, the following tests were made; one with sun-cured hay passed through a hammer mill, and the other processed in accordance with this invention.

|  | Sun Cured | This Process |
|---|---|---|
| Protein—N×6.25 ______________________ per cent__ | 11.55 | 21.89 |
| Crude Fiber ____________________________ do____ | 33.42 | 18.67 |
| Moisture ______________________________ do____ | 7.66 | 8.07 |
| Units Carotene Per Lb. (1 unit = .001 Mg.) ______ | 1,200 | 134,100 |
| Equivalent to Units Vitamin A __________________ | 2,000 | 223,500 |

The above actual tests, which did not involve separation of leaves and stem in either case, show the high superiority of this process and of the resultant product. Assuming that protein, crude fiber, carotene and vitamin components in the product made in accordance with this process are even lower than in the green alfalfa, it will be seen that the protein in the sun-dried process is only 53% of the product made in accordance with this process, while the crude fiber is about 56% of that obtained in the sun-dried process. However, the carotene and vitamin A components in this process have been retained to the extent of over 100 times that in the sun-dried process. All of this is attained with the moisture reduction to approximately the same amount.

Figure 9:
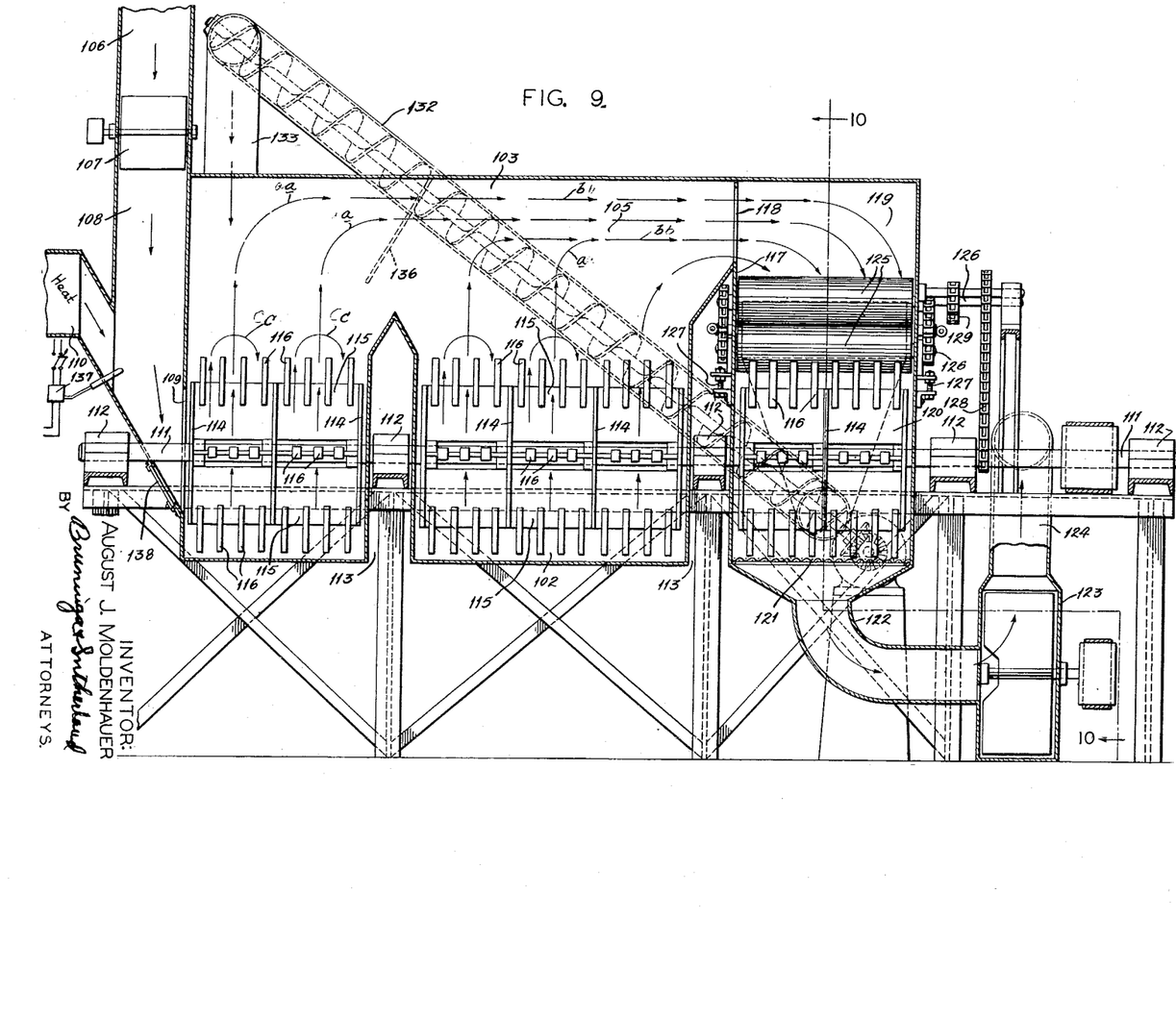
Figure 9 is a longitudinal vertical section of an apparatus illustrating another embodiment of this invention.
Figures 10, 11:
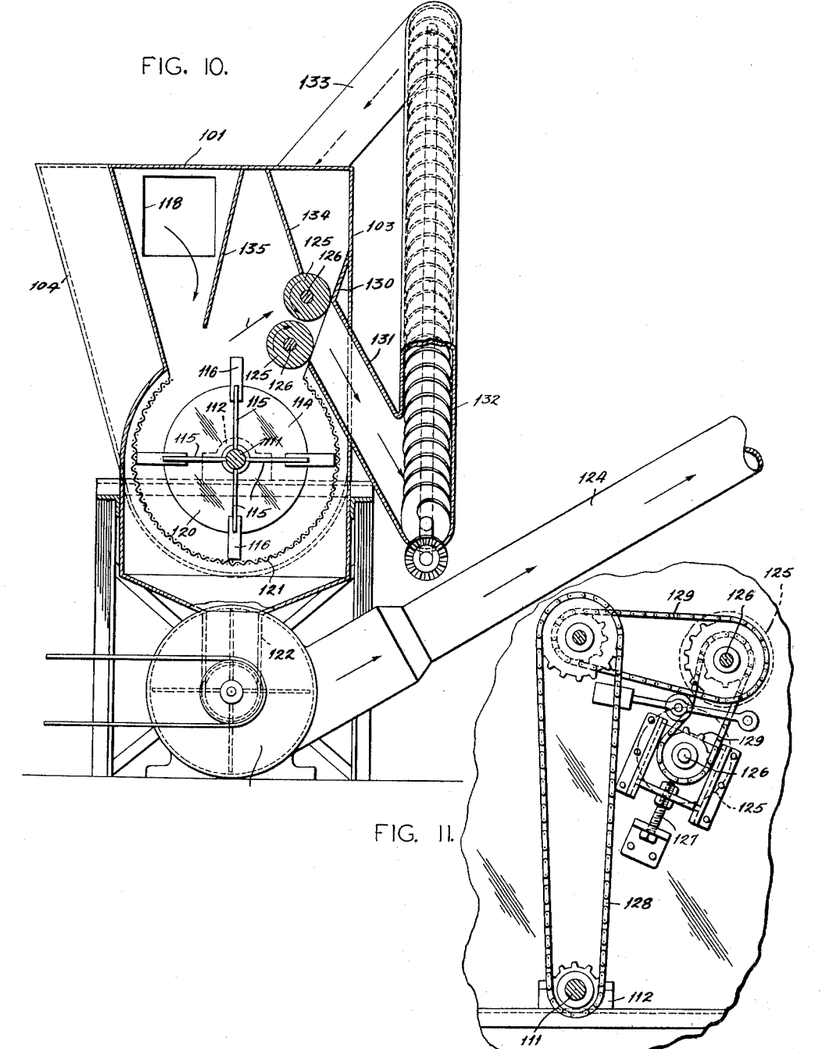
Figure 10 is a transverse section on the line 10—10 of Figure 9.
Figure 11 is a detail showing the adjustment of the ejector rolls.

Figures 9, 10 and 11 illustrate an apparatus as shown and described in applicant's application Serial No. 442,732, filed May 13, 1942. In that apparatus the green legume, chopped up as heretofore described, is subjected to heating while subjected to disintegration, but in a number of stages. In general the first stage the chopped legume is subjected to heat while being violently agitated, so as to effect a partial dehydration; and thereafter the legume is subjected to centrifugal-impacting-comminution by a hammer mill mechanism.

Referring now to Figures 9 and 10, 101 designates generally a housing which may be built of boiler iron or other suitable material. The lower part of the housing may be cylindrical, forming a compartment 102. Extending upwardly from the portion 102, a rear wall 103, which is preferably vertical, and a front wall 104, which in the embodiment illustrated flares upwardly, provide a compartment 105 in the upper portion of the housing. The flare of the front wall 104 provides additional space for the travel of hot gases, as will be described hereinafter.

Any suitable type of feeding means may be provided at 106 and this may include a chopper 107 for a preliminary cutting operation on the material. From the chopper the material passes via a chute 108 to the inlet opening 109 of the compartment 105. Hot gases are supplied by a connection 110 from a suitable furnace, not shown.

The housing 101 is extended laterally so that the compartment 105 is elongated horizontally to provide a sufficient travel for the material. The lower compartment 102 is traversed by a shaft 111 journaled in suitable bearings 112. The housing 101 may be formed with one or more openings 113 in which bearings 112 may be positioned so as to provide intermediate supports for the shaft 111, while, at the same time, the bearings 112 are protected from the excessive heat within the housing. Means are mounted on the shaft 111 in the lower compartment 102 for operating on the material. These may be formed by a plurality of circular plates 114, welded or otherwise secured to the shaft 111. Between the plates 114 at suitable angular intervals crossplates 115 are welded or otherwise secured. These plates provide fan blades adapted to set up rotary movement of the gases and of the material upon rotation of the shaft 111. These also provide supports for a series of hammers 116 mounted to extend beyond the edges of said plates and near the inside surface of the housing and so as to engage the material by impact when rotating so as to hammer up the material, as well as to throw it radially and upwardly into the compartment 105.

The compartment 105 is limited at its right end in Figure 1 by a partition 117 provided with an outlet 118, establishing communication with a compartment 119 beyond said partition. Thus the material carried by the gases traveling from left to right, Figure 9, may pass from the compartment 105 into the compartment 119 by way of the outlet 118. The shaft 111 also traverses the compartment 119, and in that compartment has mounted thereon another rotor, indicated generally at 120, and of similar construction to the rotors in the compartment 102 and equipped with similar hammers 116. However around the lower portion of the periphery of the rotor 120 is a perforated screen 121 which may be formed of a sheet of perforated material or in any other suitable manner. Below the screen 121 the housing terminates in an exhaust tube 122, passing to a suction blower 123, driven by any suitable source of power, not shown. The blower 123 provides suction to set up strong currents of the hot gases along the housing 101 from the furnace, into the unit at the right and out through the screen 121. Thus, a strong current of hot gas passing from the inlet opening 109 along the compartment 105 carries the material along said compartment and then through the outlet 118 into the compartment 119, then downwardly in the latter compartment through the rotor 120 and the screen 121, and finally out by way of the exhaust tube 122.

The gases and material drawn from the exhaust tube 122, after passing through the blower 123, may be delivered by means of a tube 124 to suitable cooling means (not shown) for cooling the finished material. Any suitable type of cooling device may be employed. It is desirable to cool the material down practically to atmospheric temperature prior to storing it in order to prevent discloroation. If bagged or stored while still hot, it has a tendency to turn brown which, of course, reduces its salability.

Mounted in the compartment 119 is an ejection device comprising a pair of rolls 125 mounted on shafts 126, journaled in any suitable manner on the housing 101. One of these rolls may be made adjustable relatively to the other as by means of an adjusting device 127, by which the distance between these rolls may be increased or diminished at will. Suitable driving means may be provided for rotating the rolls 125 in the direction indicated by the arrows in Figure 10. Such driving means may comprise a belt connection 128 to the shaft 111, or other suitable means may be provided. The two shafts 126 are also preferably connected together as by a gear or chain connection 129 to cause them to rotate at the same speed. The rolls 125 may be positioned before a plate 130 having a discharge opening opposite the space between the rolls, from which opening a discharge tube 131 leads out of the housing 101 so as to deliver the discharged material to a conveyor 132. This conveyor is arranged to carry the material received thereby back to the front end of the housing 101, to be delivered by a tube 133 to the compartment 105 adjacent the inlet opening 109 so that the material so delivered may recirculate through the apparatus. A baffle plate 134 extends close to the surface of the upper roll 125 so as to prevent material from passing over the top of that roll and lodging thereabove against the plate 130. A second baffle plate 135 extends downwardly from the top of the housing 101 adjacent the outlet 118 so as to guide the material entering the compartment 119 through said outlet away from the rolls 125 and toward the rotor 120.

A baffle 136 may, if desired, be provided. The temperature gradient established may moreover be controlled by controlling the temperature of the hot gases entering at the connection 110. Such control may be by means of a thermostatic control apparatus indicated generally at 137, or by any other suitable means. A door 138 may also be provided to provide for entrance of air in order to regulate the temperature within the apparatus. The temperature gradient may be such as to start at a temperature of 700° F. to 1200° F. at the inlet opening 109, and drop to a temperature of 250° F. or even as low as 150° F. at the outlet 122. The shaft 111 is operated at a high speed such as 1800 R. P. M., and it will be seen that at such speed the rotors 114, 116 conform with the surrounding casing 102, and the screen hammer mills which operate by centrifigul-impacting-comminution to project the material against the surrounding cylindrical walls in order to comminute the material.

The embodiment shown in Figures 9, 10 and 11 embodies generally the principles of operation heretofore described. Hot gases, which as heretofore described enter the bottom of the material inlet chute 108 at a high temperature, that is as high as 1200° F. The chopped material fed into the apparatus is dropped onto the hot gases and enters therewith into the interior of the first rotor 114, which forms with the surrounding casing a hammer mill acting by centrifugal impact to comminute the material while it is being heated. In this first stage however the material does not pass through any screen, but is thrown upwardly by centrifugal force to pass with the gases upwardly and along the apparatus to the outlet 118. Some of the material may fall back along the paths cc. Any material which has not been sufficiently comminuted falls into the second set of rotors to the right of Figure 9, particularly where a baffle 136 is employed, and is similarly subjected to centrifugal-impacting-comminution and passes along paths aa and bb to the outlet 118. Of course the region of the second set of rotors is also subject to hot gases so that comminution while heating also takes place here. The material entering the compartment 119 falls onto the rotor of the hammer mill in that compartment, and passes out through the screen 121 which is of course provided with perforations of a size suitable to secure the desired fineness of the final product. From there it is drawn off by the blower 123, and passes to storage or for packaging.

It will therefore be seen that the invention accomplishes its objects. A highly efficient process or method is provided to reduce green legume to a meal. By virtue of the operation of the process in the manner heretofore described, not only is the comminution performed in a simple and effective manner, but in such a manner as to retain the desired components of the original legume.

What is claimed is:

1. In the art of treating legumes, the process comprising, heating a green legume while subjected to comminution at a temperature and for a period, viz., at a temperature gradient of 1,000–250° F. over a period of less than one minute, both sufficient to reduce the legume to a meal.

2. In the art of treating legumes, the process comprising, heating a green legume while subjected to rapid comminution at a high temperature and for a short period, viz., at a temperature gradient of 1,000–250° F. over a period of less than one minute, both sufficient to reduce the legume to a meal.

3. In the art of treating legumes, the process comprising, subjecting a green legume to a heating zone and subjecting the legume to comminution in that zone, by subjecting the legume in that zone to a temperature gradient of 1,000–250° F. over a period of less than one minute.

4. In the art of treating legumes, the process comprising, subjecting a green legume to a high temperature heating zone and subjecting the legume for a short period to rapid comminution in that zone viz., by subjecting the legume in that zone to a temperature gradient of 1,000–250° F. over a period of less than one minute.

5. In the art of treating legumes, the process comprising, subjecting a green legume to a heating zone at a temperature gradient of 1,000–250° F. while subjected to comminution in that zone over a period of less than one minute, and moving the legume out of that zone as it becomes comminuted.

6. In the art of treating legumes, the process comprising, subjecting a green legume to a heating zone at a temperature gradient of 1,000–250° F. while subjected to comminution free-in-space in that zone over a period of less than one minute.

7. In the art of treating legumes, the process comprising, subjecting a green legume to a heating zone at a temperature gradient of 1,000–250° F. while subjected to comminution in that zone over a period of less than one minute, and moving the legume out of that zone as it becomes comminuted and before material conversion of the organic constituents of the legume.

8. In the art of treating legumes, the process comprising, subjecting a green legume to a heating zone at a temperature gradient decreasing from at least 500° F. while subjected to rapid comminution at less than one minute and moving the legume out of that zone before material conversion of the organic constituents of the legume.

9. In the art of treating legumes, the process comprising, subjecting a green legume to a heating zone at a temperature gradient decreasing from at least 500° F. while subjected to centrifugal-impacting-comminution and moving the legume centrifugally out of that zone as it becomes comminuted.

10. In the art of treating legumes, the process comprising, subjecting a green legume to a heating zone at a temperature gradient decreasing from at least 500° F. while subjected to centrifugal-impacting-comminution and coordinating the centrifugal-impacting and the temperature in that zone to cause the legume to move out of that zone after substantial dehydration and comminution of the legume.

11. In the art of treating legumes, the process comprising, subjecting a green legume to a heating zone at a temperature gradient decreasing from at least 500° F. while subjected to centrifugal-impacting-comminution and coordinating the centrifugal-impacting and the temperature in that zone to cause the legume to move out of that zone after substantial dehydration and comminution of the legume but before material conversion of the organic constituents of the legume.

12. In the art of treating legumes, the process comprising, passing a green legume into a zone of hot gases at a temperature gradient decreasing from at least 500° F., subjecting the legume in that zone to centrifugal-impacting-comminution and moving the legume as it becomes comminuted, with the residual gases out of that zone.

13. In the art of treating legumes, the process comprising, passing a green legume into a zone of hot gases at a temperature gradient decreasing from at least 500° F., subjecting the legume in that zone to centrifugal-impacting-comminution, moving the legume as it becomes comminuted, with the residual gases out of that zone and coordinating the centrifugal-impacting and the temperature of the gases to prevent overheating of the legume.

14. In the art of treating legumes, the process comprising, heating a green legume while subjected to comminution at a temperature and for a period, viz., at a temperature gradient of 1,000–250° F. over a period of less than one minute, both sufficient to reduce the legume to a meal and reducing the temperature of the meal to normal.

15. In the art of treating legumes, the process comprising, subjecting a green legume to a heating zone while subjected to a comminution in that zone, by subjecting the legume in that zone to a temperature gradient of 1,000–250° F. over a period of less than one minute and subjecting the comminuted legume to a cooler zone.

16. In the art of treating legumes, the process comprising, subjecting a green legume to a heating zone while subjected to a comminution in that zone, by subjecting the legumes in that zone to a temperature gradient of 1000–250° F. over a period of less than one minute, and subjecting the comminuted legume to a cooler zone while being further comminuted.

AUGUST J. MOLDENHAUER.

REFERENCES CITED

The following references are of record in the file of this patent:

UNITED STATES PATENTS

| Number | Name | Date |
|---|---|---|
| 1,994,343 | Grave | Mar. 12, 1935 |
| 2,086,338 | Sodergreen | July 6, 1937 |
| 2,241,654 | Arnold | May 13, 1941 |
| 2,446,952 | Randolph | Aug. 10, 1948 |